P. BARDY.
APPARATUS FOR DISPENSING LIQUIDS.
APPLICATION FILED JULY 6, 1907.
908,194.
Patented Dec. 29, 1908.
2 SHEETS—SHEET 1.
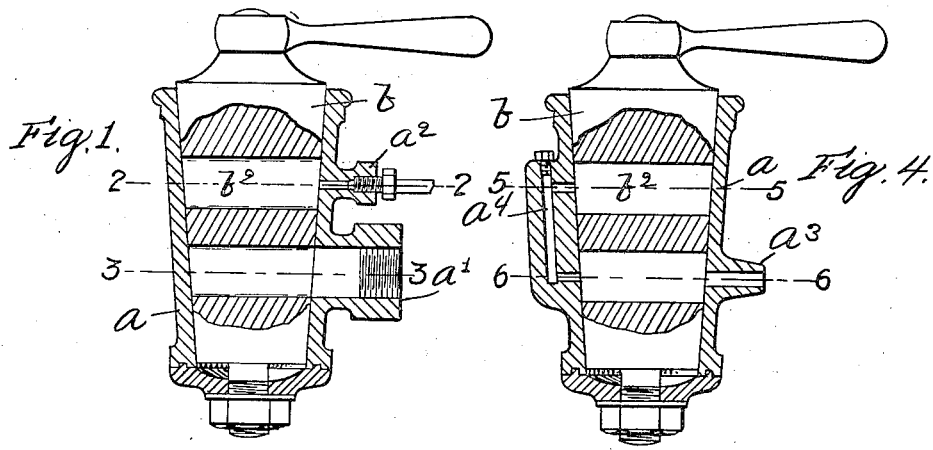
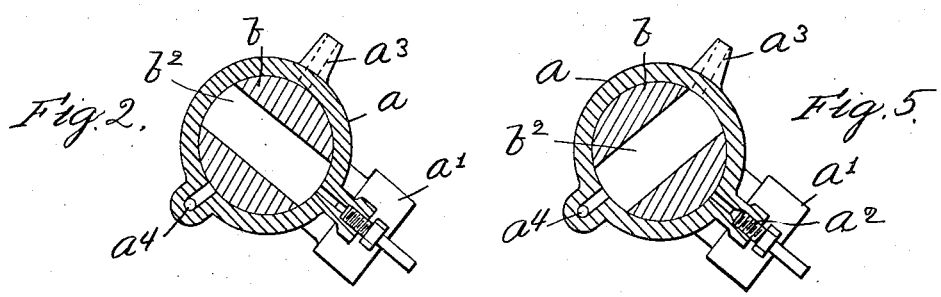
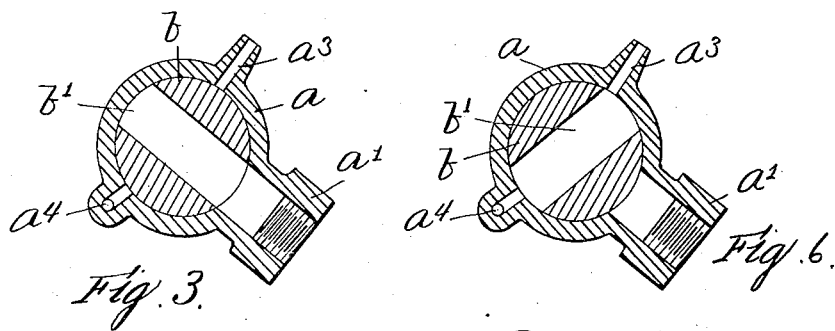
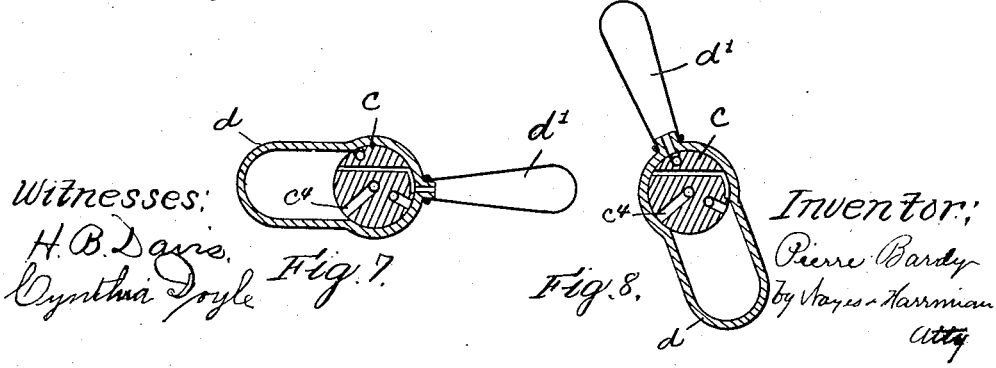
Witnesses:
H. B. Davis
Cynthia Doyle
Inventor:
Pierre Bardy
by Hayes-Harriman
Atty

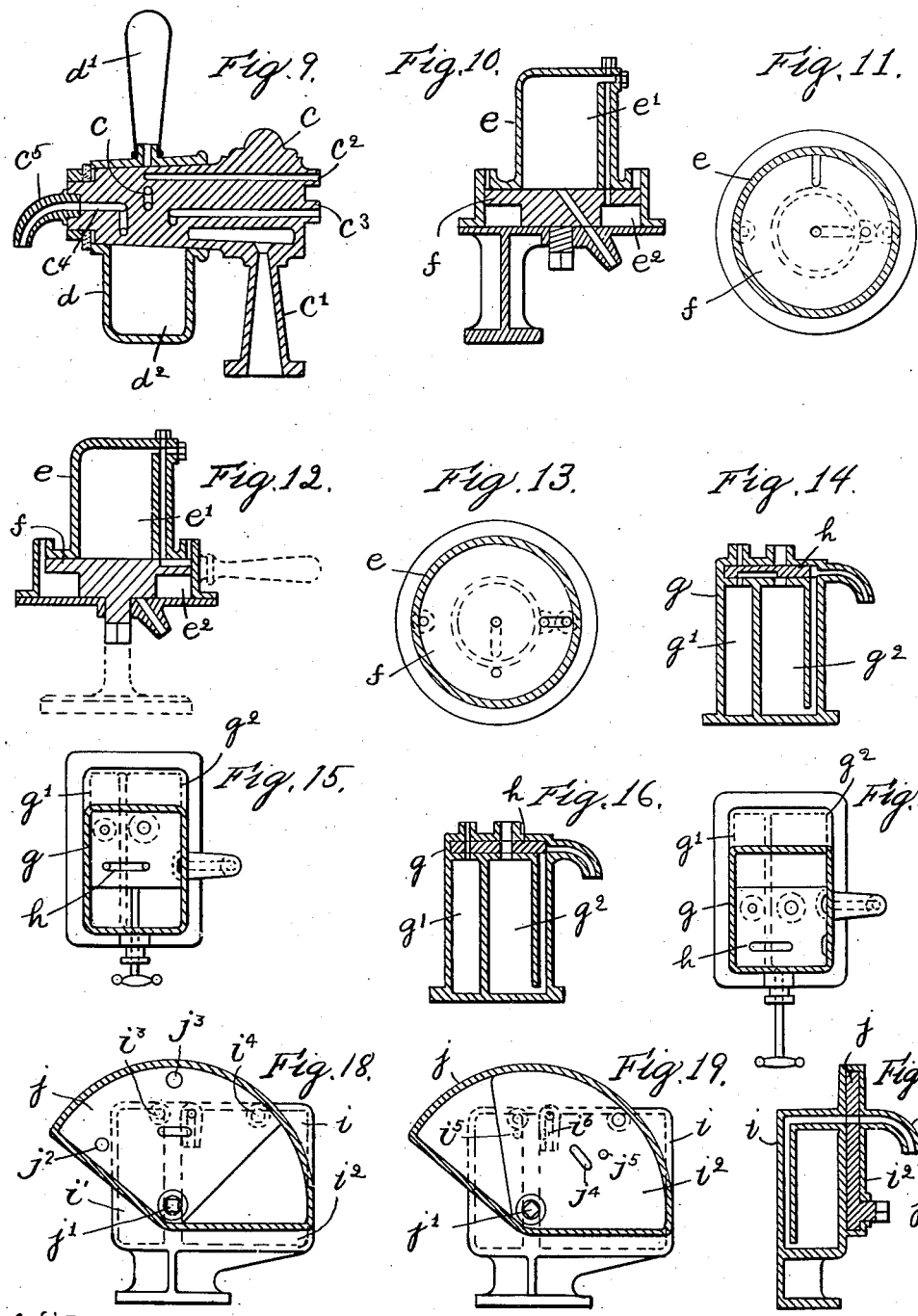

UNITED STATES PATENT OFFICE.

PIERRE BARDY, OF PARIS, FRANCE.

APPARATUS FOR DISPENSING LIQUIDS.

No. 908,194.  Specification of Letters Patent.  Patented Dec. 29, 1908.

Application filed July 6, 1907. Serial No. 382,520.

*To all whom it may concern:*

Be it known that I, PIERRE BARDY, of Paris, Republic of France, have invented an Improvement in Apparatus for Dispensing Liquids, of which the following description, in connection with the accompanying drawings, is a specification, like characters on the drawings representing like parts.

This invention has for its object to construct an apparatus for dispensing two volumes of liquid and gas, respectively, preferably in measured quantities, and for mixing them at the moment of delivery, whereby a measured volume of liquid may be charged, or if previously charged, may be additionally charged, with a measured volume of gas, and the charged liquid dispensed, the liquid at no time coming in contact with the atmosphere until it is delivered; yet my invention is applicable to the mixing and dispensing of two different liquids, instead of a liquid and a gas.

The invention consists in a dispensing apparatus comprising a member having two chambers respectively adapted to receive a liquid and a gas, or it may be two different liquids, and a controlling-member for controlling the simultaneous delivery of the contents of said chambers, said controlling-member having a conduit or by-pass by which communication is established between the chambers when the contents thereof is being dispensed, so that, in the case of a liquid and a gas, the liquid may be charged, or if previously charged may be additionally charged, at the moment of dispensation, or in the case of two different liquids, they may be mixed at the momemt of dispensation.

The invention also consists in dispensing apparatus comprising a member having two chambers respectively adapted to receive a liquid and a gas, or two different liquids, as the case may be, and a controlling-member for controlling the supply of liquid and gas, or two different liquids, to said chambers, and for also controlling the simultaneous dispensation of the contents of said chambers, said controlling-member having a conduit or by-pass by which communication is established between the chambers when the contents thereof is being dispensed.

Figure 1 shows in longitudinal section an apparatus for dispensing liquid embodying this invention, the parts being in the position they will occupy when the apparatus is being filled. Figs. 2 and 3 are sections of the same taken respectively on the dotted lines 2—2 and 3—3 Fig. 1. Fig. 4 is a longitudinal section of the apparatus, the parts being in the position they will occupy when the contents of the chambers are being dispensed. Figs. 5 and 6 are sections of the device shown in Fig. 4, taken respectively on the dotted lines 5—5 and 6—6. Figs. 7, 8 and 9 are sectional views of a modification to be referred to. Figs. 10, 11, 12 and 13 are sectional views of another modification to be referred to. Figs. 14, 15, 16 and 17 are sectional views of another modification to be referred to. Figs. 18, 19 and 20 are sectional views of another modification to be referred to.

Referring to Figs. 1 to 6, $a$ represents one of the members and $b$ the other member of the dispensing apparatus. The member $a$ is made as a conically formed casing and has a nipple $a'$ projecting laterally from it, by which it may be connected with a reservoir, not shown, containing the liquid to be dispensed. The casing $a$ also has a nipple $a^2$ extended laterally from it for the reception of a pipe communicating with a reservoir, not shown, containing gas under pressure. This gas is or may be of the same nature as that dissolved in the liquid or it may be an inert gas if the liquid is not itself gaseous. The casing $a$ also has a delivery orifice $a^3$ extending laterally from it. The casing $a$ also has formed in its wall, preferably at a thickened part thereof, a passage $a^4$, see Fig. 4, which opens into the interior of the casing at two different points. The member $b$ is made as a tapering plug to fit the casing $a$, and said plug has two chambers $b'$, $b^2$, formed by boring or otherwise forming cylindrical or other shaped holes transversely through its body. These two chambers are located one above the other and in parallelism. They are so located with respect to the nipples and the delivery orifice and the openings to the passage $a^4$, that when the plug is turned in the casing and occupies a certain position, they will communicate respectively with the reservoirs containing the liquid and gas, and at such time they will be disconnected from the passage $a^4$ and from the delivery orifice, and therefore are isolated from each other; and when the plug is again turned in the casing they will be disconnected from the reservoirs and will be connected with the passage $a^4$ and delivery orifice, and at such time communication between them is established and the delivery orifice opened. The passage $a^4$ thus serves as a connecting passage between the chambers. When the chambers are being filled, the parts will occupy the position shown in Figs. 1, 2 and 3, wherein it will be seen that the chamber $b'$ is in open communication with the nipple $a'$, and the chamber $b^2$ is in open communication with the nipple $a^2$, and the openings to the passage $a^4$ and delivery orifice $a^3$ are shut off. When the plug is turned into the position shown in Figs. 4, 5 and 6, the chambers are disconnected from the nipples $a'$ and $a^2$ and are connected with the openings to the passage $a^4$ and with the delivery orifice $a^3$, and at such time the contents of the chambers will be dispensed, the gas which is contained in the chamber $b^2$ passing through the passage $a^4$ into the chamber $b'$ and forcing the contents of said chamber $b'$ out through the delivery orifice at the same time mixing therewith.

The pressure of gas contained in the chamber $b^2$ will cause the liquid to flow without the outer air displacing it. The gas, if any remains in the chamber $b'$ when the liquid is dispensed will dissolve in the liquid which next enters the chamber.

By means of this dispensing apparatus it is possible, while improving their sparkling qualities and avoiding all useless loss or expenditure of gas, to supply sparkling wine, champagne, lemonade aerated waters and spirits with gas, to which gums, sugars and other substances for causing the foam produced at the moment of dispensing to last as long as possible, have or have not been added. The apparatus is equally applicable for liquors and syrups, with or without the addition of aerated waters, and, generally speaking, for liquors of all kinds regardless of their condition.

My device may be employed for bottling purposes, it operating to deliver measured volumes to the bottles which are being filled.

In industries in which this method of dispensing is required it is possible to dispense predetermined volumes of liquids or reagents without contact with the open air. Herein two different liquids are considered to be the equivalent of a liquid and a gas and will be so understood.

Referring to Figs. 7, 8 and 9, the member $c$ is fixed to a base $c'$ and has two nipples $c^2$, $c^3$, adapted to be connected respectively with two separate reservoirs, and has a connecting passage $c^4$, and a delivery orifice $c^5$; and the member $d$ is movable and is mounted on said fixed member and has two chambers $d'$, $d^2$, respectively, for the liquid and gas. The movable member is rotatable on the stationary member, instead of within it, as shown in Figs. 1 to 6, but the operation of the device is substantially the same as the device shown in said figures.

Referring to Figs. 10, 11, 12 and 13, $e$ represents the stationary member and $f$ the movable member, and said member $f$ is rotatably mounted on or with respect to said member $e$, to turn in a horizontal plane, and in said member $e$ a chamber $e'$ is formed above said member $f$ and a chamber $e^2$ is formed below said member, and a connecting passage and a delivery orifice are provided, whereby the same results may be obtained as are obtained by the construction shown in Figs. 1 to 6.

Referring to Figs. 14, 15, 16 and 17, $g$ represents the stationary member and $h$ the movable member, and the member $g$ is formed with chambers $g'$, $g^2$, and the member $h$ is made as a plate, adapted to slide horizontally, and is formed with passages, whereby the same results may be obtained as are obtained by the construction shown in Figs. 1 to 6.

Referring to Figs. 18, 19 and 20, $i$ represents the stationary member and $j$ the movable member. The member $i$ has two chambers, $i'$ for the gas and $i^2$ for the liquid, see dotted lines, also an inlet orifice $i^3$ to the gas chamber and an inlet orifice $i^4$ to the liquid chamber, also an outlet orifice $i^5$ for the gas chamber and an outlet orifice $i^6$ for the liquid chamber, and also a delivery orifice $i^7$ leading from a passage communicating with the liquid chamber $i^2$. The member $j$ is made as a sector which is fitted in a suitably shaped recess in the stationary member. It is pivoted at its lower end to the stationary member and its pivot $j'$ projects forward and its end is exposed to receive a key by which it may be turned. It has an orifice $j^2$ adapted to register with the inlet orifice $i^3$ and an orifice $j^3$ adapted to register with the inlet orifice $i^4$, and a slot $j^4$ adapted to establish communication between the orifices $i^5$ and $i^6$, and an orifice $j^5$ adapted to register with the delivery orifice $i^7$. When the parts are in the position shown in Fig. 19, the supplies are connected with the chambers and the outlet orifices and the delivery orifice are closed, and at such time the device is filled, and when the parts are in the position shown in Figs. 18 and 20, the supplies are shut off and the outlet orifices and the delivery orifice are opened, and at such time the gas is discharged through the liquid chamber, driving the contents of said chamber out through the delivery orifice, mixing therewith as the contents of the two chambers are dispensed.

From the foregoing it will be understood that I do not desire to limit my invention to the particular construction of the members employed as long as they are constructed and arranged to operate with respect to each other to obtain the results set forth by the construction shown in Figs. 1 to 6.

Having thus described my invention, what I claim as new and desire to secure by Letters Patent is:—

1. An apparatus for dispensing liquids having two chambers adapted to receive respectively a liquid and a gas, and a delivery orifice, and means for connecting the two chambers together and for also connecting one of them only with the delivery orifice, whereby the contents of one chamber will be discharged through the other chamber, substantially as described.

2. An apparatus for dispensing liquids having two chambers adapted to receive respectively a liquid and a gas and a delivery orifice, and means operating simultaneously to connect the two chambers together, and also to connect one of them only with the delivery orifice, whereby both chambers are discharged, the contents of one passing through the other, substantially as described.

3. An apparatus for dispensing liquids having two normally disconnected chambers adapted to receive respectively a liquid and a gas, and a delivery orifice normally disconnected from said chambers, means for disconnecting said chambers from their supplies and for simultaneously connecting them together and for connecting one of them only with the delivery orifice, substantially as described.

4. An apparatus for dispensing liquids having two chambers adapted to receive respectively a liquid and a gas and having a passage for connecting them together, and a delivery orifice communicating with one of said chambers only when the two chambers are connected together, substantially as described.

5. An apparatus for dispensing liquids having two chambers adapted to receive respectively a liquid and a gas, and having passages for connecting them with their supplies, and a passage for connecting them together, and a delivery orifice with which one of said chambers communicates when the two chambers are connected together, substantially as described.

6. An apparatus for dispensing liquids comprising a movable member having two disconnected chambers, a stationary member having passages for connecting said chambers respectively with their supplies and a passage for connecting said chambers together, and a delivery orifice with which one of said chambers only communicates when the two chambers are connected together, substantially as described.

7. An apparatus for dispensing liquids comprising a movable member having two disconnected chambers, a stationary member having passages for connecting said chambers respectively with their supplies and a passage for connecting said chambers together, and a delivery orifice with which one of said chambers only communicates when the two chambers are connected together, and means for moving said movable member to simultaneously connect said chambers together and to connect one of the chambers only with the delivery orifice, substantially as described.

In testimony whereof, I have signed my name to this specification, in the presence of two subscribing witnesses.

PIERRE BARDY.

Witnesses:
EDOUARD THOMAL,
RENÉ DUCHANING.